(12) United States Patent
Huff et al.

(10) Patent No.: US 10,683,174 B2
(45) Date of Patent: Jun. 16, 2020

(54) ROTARY DISCHARGE ASSEMBLY FOR GRAIN CONVEYING APPARATUS

(71) Applicant: Global Industries, Incorporated, Grand Island, NE (US)

(72) Inventors: Jeremy J. Huff, Clay Center, KS (US); Douglas Kruse, Palmer, KS (US); Michael Patenaude, Clay Center, KS (US); Bradley D. Smith, Saint George, KS (US)

(73) Assignee: AG GROWTH INTERNATIONAL INC., Winnipeg (CA)

( * ) Notice: Subject to any disclaimer, the term of this patent is extended or adjusted under 35 U.S.C. 154(b) by 273 days.

(21) Appl. No.: 15/476,316

(22) Filed: Mar. 31, 2017

(65) Prior Publication Data

US 2018/0282067 A1    Oct. 4, 2018

(51) Int. Cl.
 *B65G 47/78* (2006.01)
 *B65G 11/20* (2006.01)

(52) U.S. Cl.
 CPC .................... *B65G 11/206* (2013.01)

(58) Field of Classification Search
 CPC .............................. B65G 11/206; B65G 47/78
 See application file for complete search history.

(56) References Cited

U.S. PATENT DOCUMENTS

| | | | |
|---|---|---|---|
| 3,001,633 A | 3/1960 | Heitshu | |
| 3,111,115 A | 11/1963 | Best | |
| 3,256,862 A | 6/1966 | Patterson | |
| 3,270,857 A | 9/1966 | Wilkes et al. | |
| 3,279,592 A | 10/1966 | Kerkvliet | |
| 3,292,585 A | 12/1966 | Buschbom et al. | |
| 3,357,540 A | 12/1967 | Lippi | |
| 3,435,804 A * | 4/1969 | Orlowski | A01K 61/85 119/51.11 |
| 4,089,300 A | 5/1978 | Keen et al. | |
| 4,454,943 A * | 6/1984 | Moller | B65G 33/24 198/657 |
| 5,513,597 A | 5/1996 | Pollock | |
| 5,526,920 A * | 6/1996 | Ellsworth | B65G 47/78 198/658 |
| 5,555,967 A * | 9/1996 | Hufford | B65G 47/78 198/359 |

(Continued)

FOREIGN PATENT DOCUMENTS

| | | |
|---|---|---|
| DE | 4314109 A1 | 10/1993 |
| EP | 0397271 A1 | 11/1990 |

*Primary Examiner* — Jonathan Snelting
(74) *Attorney, Agent, or Firm* — John F. Klos; Billion & Armitage (57) ABSTRACT

A flow-through discharge assembly having a rotatable tube section and an opening through which product is discharged and a positioning apparatus for rotating the tube section between operation and non-operational conditions. When the tube is positioned in an operational orientation, grain exits through the opening for discharge from the assembly. When the tube is returned to a non-operational condition, the tube opening is blocked and grain is prevented from exiting through the opening. The tube opening may be a single elongated opening or may include multiple tube openings through which product is discharged. A method of using a rotary discharge assembly to control grain flow within a grain handling system is also disclosed.

15 Claims, 14 Drawing Sheets

(56) References Cited

U.S. PATENT DOCUMENTS

| | | | |
|---|---|---|---|
| 5,697,327 A | 12/1997 | Pollock et al. | |
| 6,267,227 B1 | 7/2001 | McGoun | |
| 6,378,688 B1 * | 4/2002 | Fitzgerald | B65G 27/04 |
| | | | 198/360 |
| 9,975,702 B2 * | 5/2018 | Bertolini | B65G 19/14 |
| 10,005,623 B1 * | 6/2018 | Svejkovsky | B65G 47/72 |
| 2015/0251852 A1 | 9/2015 | Nicholson | |

* cited by examiner

ROTARY DISCHARGE ASSEMBLY FOR GRAIN CONVEYING APPARATUS

TECHNICAL FIELD

The invention is directed to an advancement in the field of materials handling. More specifically, this application relates to a controllable discharge assembly for a grain or dry goods conveying system.

BACKGROUND OF THE INVENTION

Various grain conveying systems have been employed for transporting grain to and from grain storage bins or the like. Grain handling systems include both pneumatic conveyors and chain or related mechanical conveyors. In a typical tube-based system, grain to be conveyed is introduced into the system at a grain inlet, such as a pit or vacuum head. Downstream from the grain inlet the tubing system may be directed upwardly, for example, along the sidewall of a grain bin, and along the sloped, conical grain bin roof to a center grain opening in the grain bin roof. In a typical installation, a grain inlet may supply multiple grain bins and one or more discharge spouts are used to control the flow of grain within the system.

In one current chain and paddle conveyer system, a flow-through discharge spout includes a curved movable gate attached at an opening of a stationary tube section. The spout discharges when the movable gate is opened to allow grain to flow out of the tube section. The movable gate includes one or more gear racks driven by a pinion gear to open or close the gate. The movable gate may be manually operated or electrically controlled with an electric motor used to transition the gate between open and closed conditions. Limitations of the movable gate discharge spout include difficulty in manufacturing a closely-toleranced curved gate and operational difficulty as dust and debris tends to collect on the gate or gear rack which leads to increased friction and gate jamming. A need therefore exists for an improved discharge spout for a tube-based grain distribution system.

SUMMARY OF THE INVENTION

The present invention provides a controllable discharge assembly for a grain or dry goods conveying system. In one embodiment, the discharge assembly functions as outlet for a chain conveyer system, including chain and paddle conveyors.

In one embodiment of the present invention, the discharge assembly includes a rotatable tube section having an opening through which product is discharged and a positioning apparatus for rotating the tube section between operation and non-operational conditions. When the tube is positioned in an operational orientation, grain exits through the opening for discharge from the assembly. A lower spout receives grain exiting the discharge assembly and directs the grain, for example, into a storage bin. When the tube is returned to a non-operational condition, the tube opening is blocked and grain is prevented from exiting through the opening. The tube opening may be a single elongated opening or may include multiple tube openings through which product is discharged.

The present invention is also directed to a method of using a rotary discharge assembly to control grain flow within a grain handling system. The method includes revealing a tube opening to allow gravitational discharge of grain out of the discharge assembly when the tube is rotated. A flexible sheet is used to block the tube opening when the tube is rotated to a closed configuration. Tube rotation can be manually or electrically controlled.

An object of the present invention is to provide a rotary discharge assembly whereby the discharge assembly is a modular unit suitable for use in a variety of different loop conveyor systems.

A further object of the present invention is a rotary discharge assembly having a rotatable tube section which is selectively opened and closed depending on the angular orientation of the tube section. In one embodiment, a flexible sheet is partially wrapped around a length of the rotatable tube.

A further object of the invention is to provide a flow-through discharge assembly for loop conveyors, including chain and paddle grain conveyors.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

A chain and paddle tube-based grain conveyor typically comprised a plurality of paddles or disks dispersed along a chain and contained within a tube loop. The paddles are generally perpendicular to the chain and are dragged within a tube assembly to transport particulate material, such as grain or animal feed, through the tube assembly. A main advantage of chain disk conveyors is that they provide an enclosed conveying system that can operate at any angle, in any plane and from point to point regardless of what lies between.

As is known, chain and paddle conveyors comprise a path or loop defined by a tube through which the chain of paddles moves. Wheel assemblies are generally provided when the path turns a corner to facilitate the travel of the chain around corners in the path. The wheel assembly or corner housing generally comprises a rotatable wheel contained within the housing.

Figure 1:
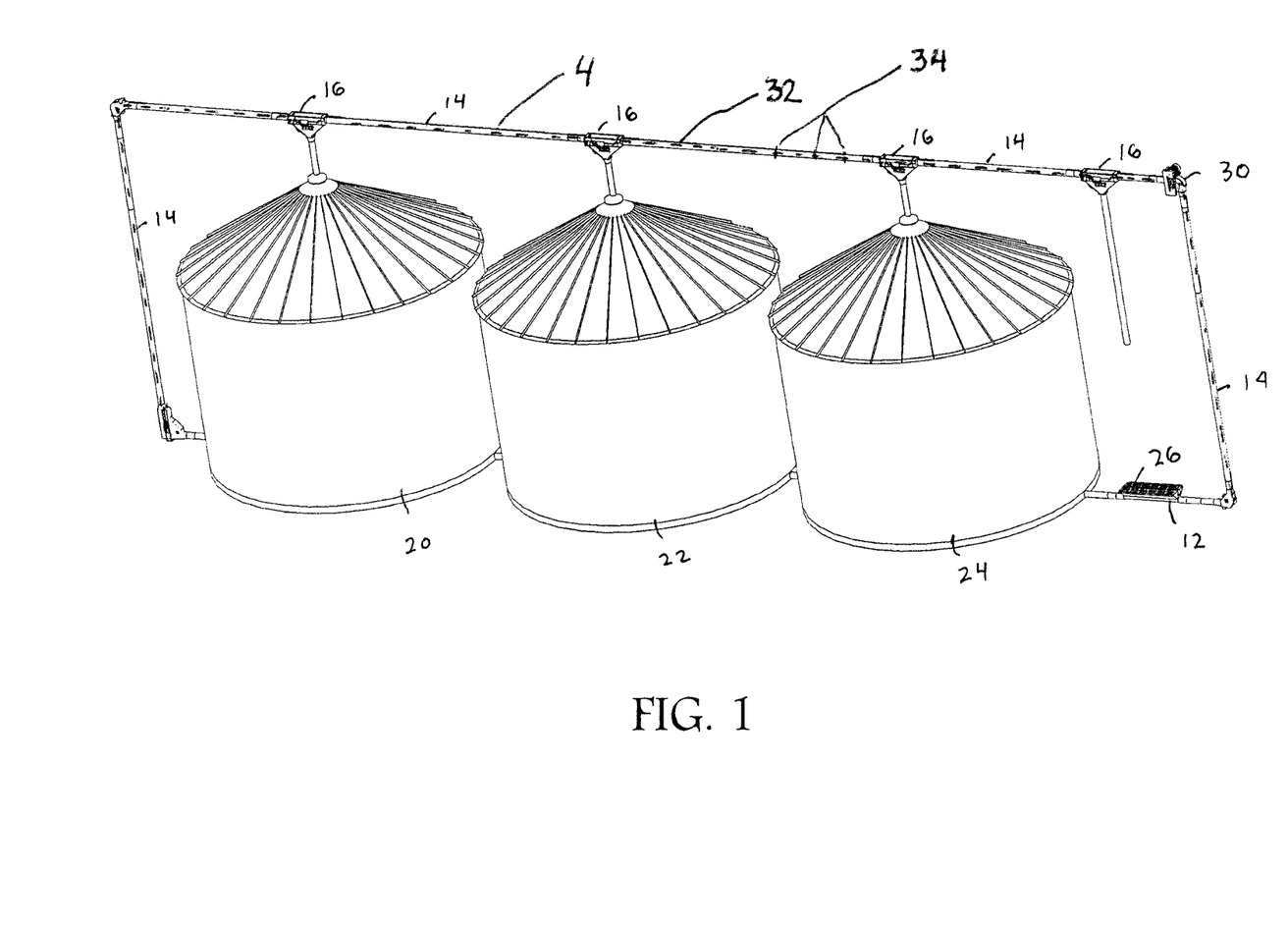
FIG. 1 is a perspective view of a grain storage system incorporating the discharge spout in accordance with the present invention.

Referring to FIG. 1, a grain storage system includes a chain and paddle conveyor 4, a grain inlet 12, a plurality of tube sections 14, and a plurality of discharge spouts 16. Discharge spouts 16 are positioned above grain storage bins 20, 22, 24. Another discharge spout 16 is positioned above a drive-over grain pit hopper 26. A drive corner 30 includes a drive motor and drive wheel engaging the conveyor chain 32 to circulate the chain 32 and paddles 34 of the chain and paddle conveyor 4 within the tube sections to convey grain within the system. While the example of a handling system for grain is described herein in detail, the present invention is suitable for use with a variety of flowable dry goods and is not limited in scope to grain or related dry goods. For example, bulk products such as soy, corn, wheat, rice, oats, barley and coffee can be conveyed within the storage system.

Figure 2:
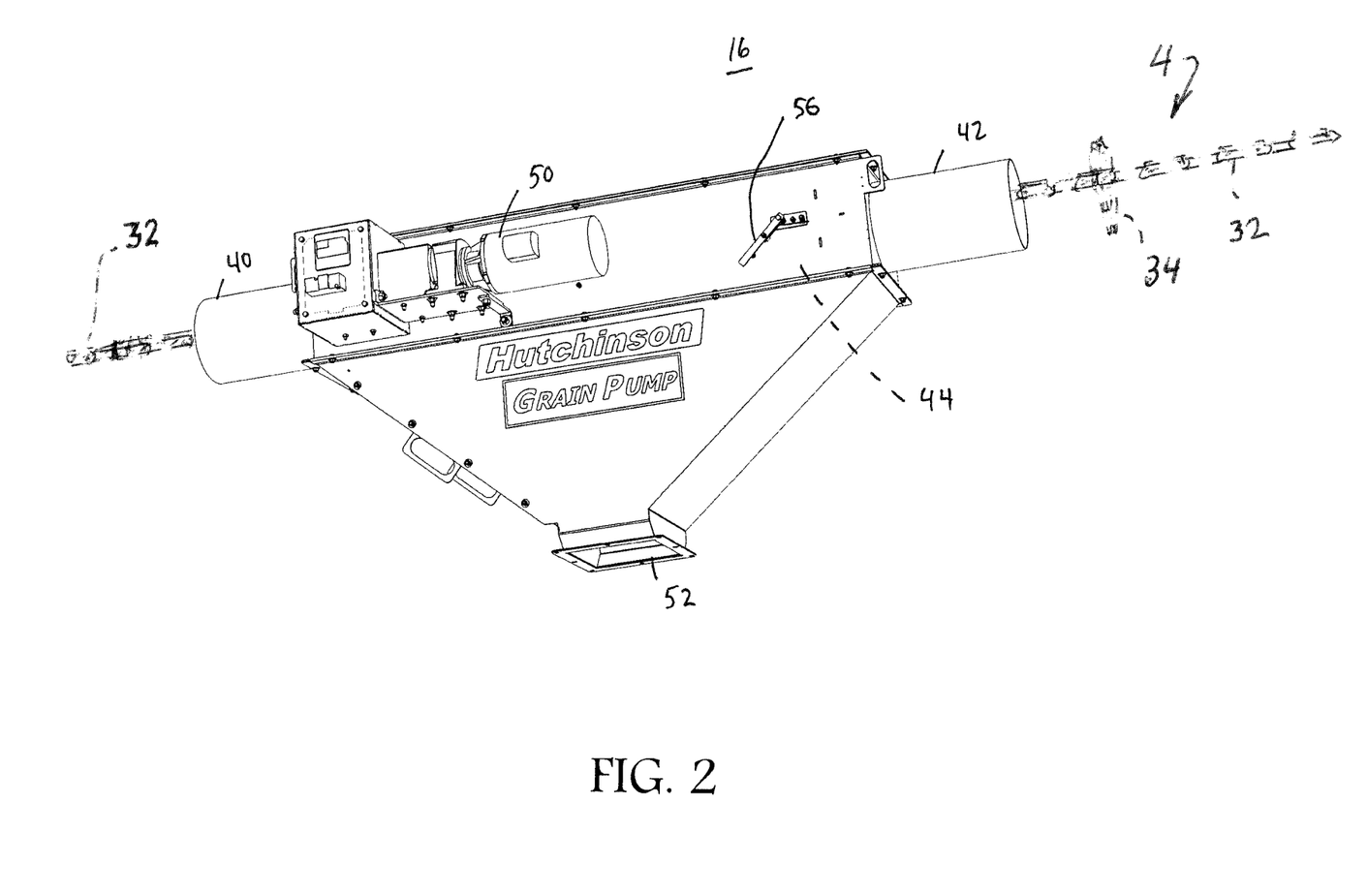
FIG. 2 is a perspective view of a discharge spout of FIG. 1.

FIG. 2 illustrates a modular discharge spout 16. Spout 16 includes a pair of stationary tube sections 40, 42 adapted, for example, to be coupled to tube sections 14 of the grain storage system of FIG. 1. As described in greater detail hereinafter, an internal rotatable tube section is held in alignment with tube sections 40, 42 to provide a flow-through spout design. The rotatable tube section is identified as numeral 44 in subsequent figures. As shown, the rotatable tube 44 includes an opening 46 through which grain can pass when the tube 44 is rotated into a discharge orientation.

An electric motor assembly 50 functions to rotate the movable tube 44 and position the tube opening 46 to allow grain to drop out of the movable tube and exit through lower discharge opening 52. An external visual indicator provides tube position information by rotating an indicator arm 56. The entire discharge spout 16 is preferably of modular design and intended to be installed at various locations within a grain loop system.

Figure 3:
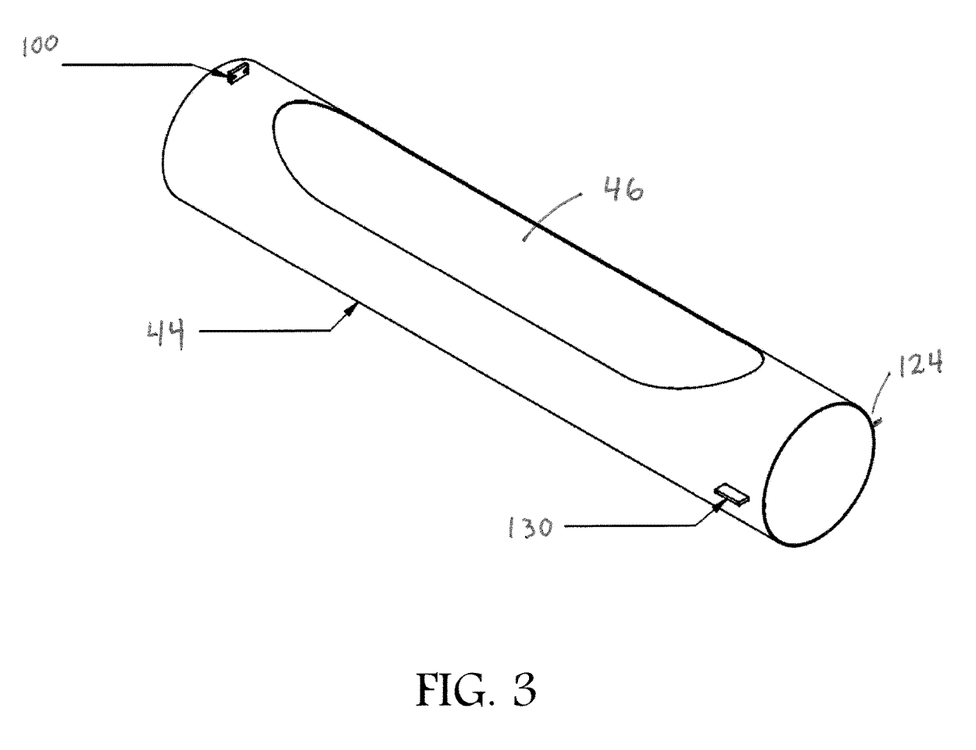
FIG. 3 is a perspective view of a rotatable tube component of the discharge spout of FIG. 1.

FIG. 3 is a perspective view of the rotatable tube 44 including opening 46 which can be blocked to prevent grain flow or opened to allow grain discharge. The tube sections 40, 42 and the rotatable tube section 44 have substantially identical internal diameters allowing the chain and paddles to freely pass through the discharge spout 16. Opening 46 of rotatable tube 44 is illustrated as a single elongated opening in the side of tube 44. In other embodiments, opening 46 may include multiple openings in tube 44. The quantity and size of the side openings 46 may vary depending on particular engineering constraints. For example, overall tube 44 stiffness may be improved by using smaller and/or fewer openings 46. Openings 46 need not be oblong or circular and a variety of openings shapes are envisioned.

Figure 4:
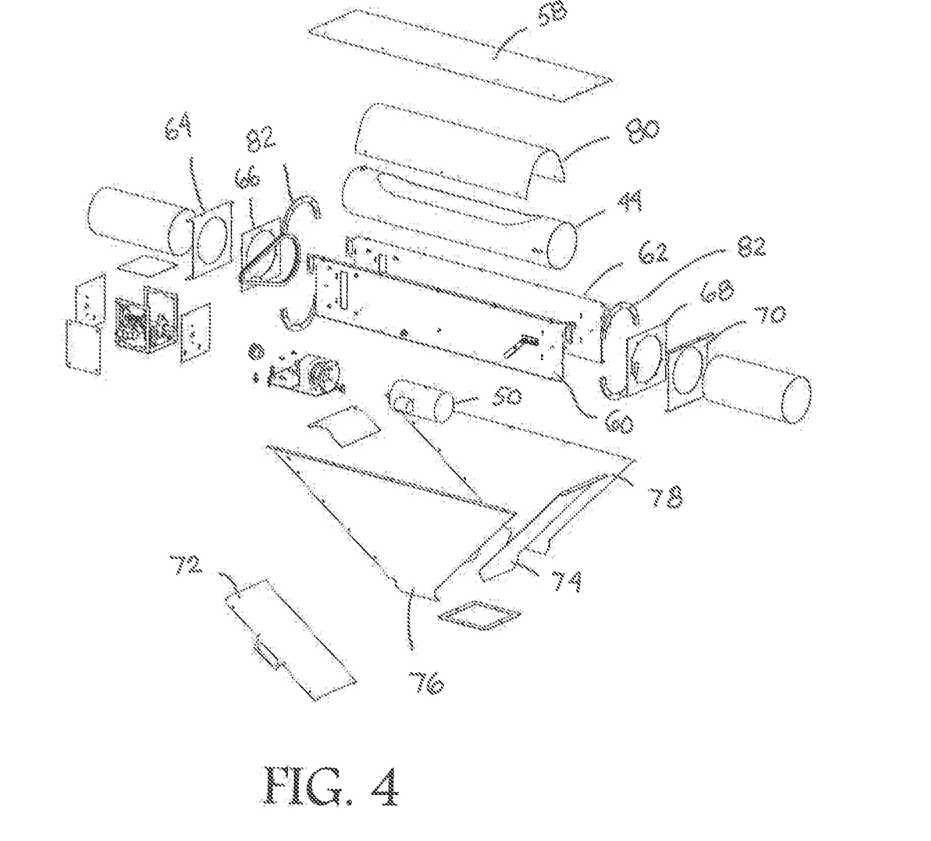
FIG. 4 is an exploded perspective view of the discharge spout of FIG. 2.

FIG. 4 is an exploded perspective view of the discharge spout 16. A frame includes a top panel 58, front panel 60, rear panel 62 and side panels 64, 66, 68, 70. A lower spout is defined by angled panels 72, 74, 76, 78. A flexible sheet 80 is secured between panels 60, 62 and engages tube 44. When tube 44 is rotated to its non-discharge state, sheet 80 completely blocks the tube opening 46 to prevent the flow of grain. When tube 44 is rotated to its discharge state, sheet 80 while still engaging tube 44, does not block the flow of grain out of opening 46. Sheet 80 is preferably a low friction, flexible sheet good. In alternative embodiments, sheet 80 may be defined as molded cover or panel (not shown).

Figure 5:
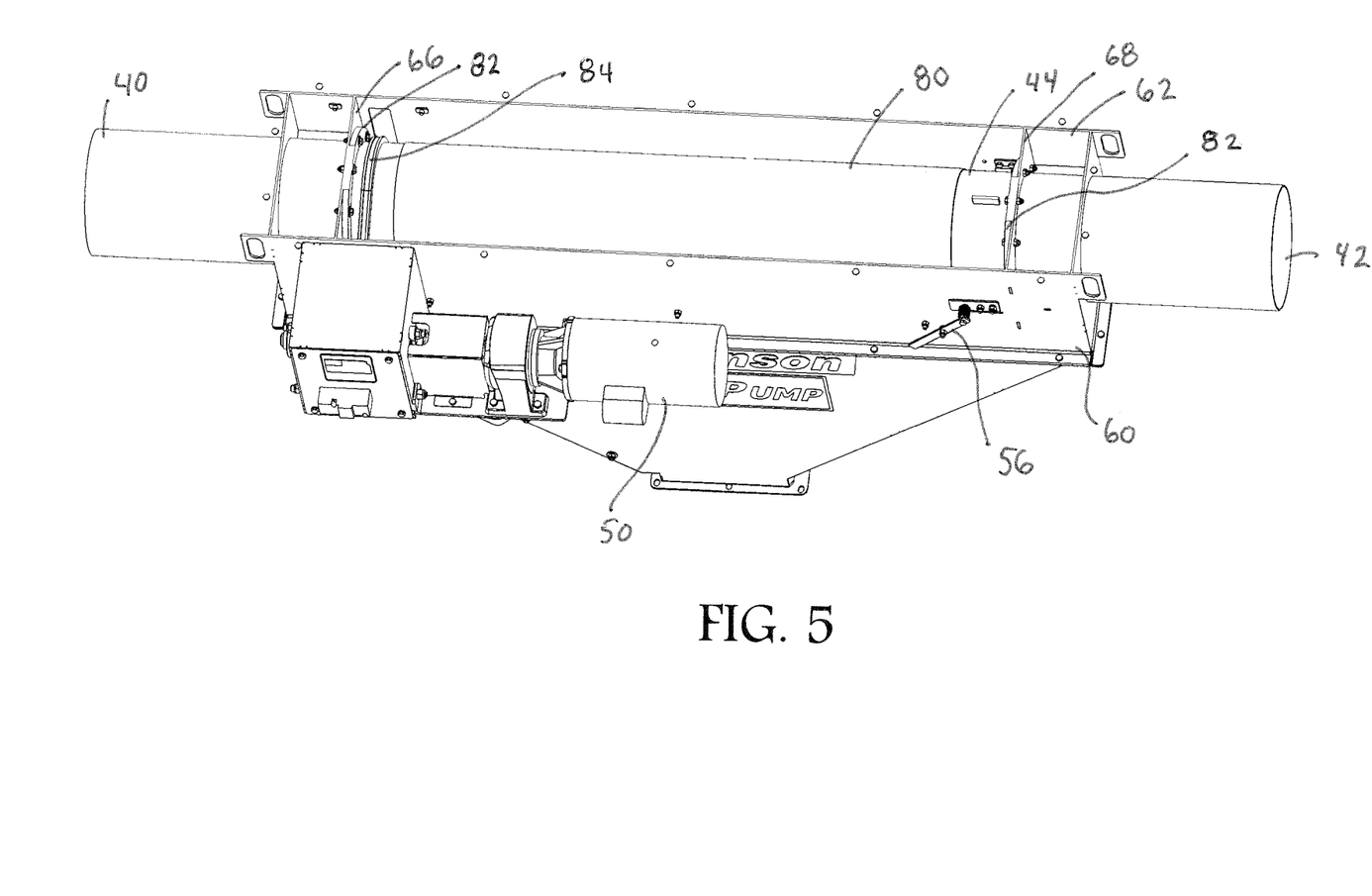
FIG. 5 is another perspective view of the discharge spout of FIG. 2.

FIG. 5 is a top perspective view of the modular discharge spout 16 with top panel 58 removed. Movable tube 44 is held between side panels 66, 68 by a pair of split-ring bearings 82 and is rotated via a drive chain 84 coupled to motor assembly 50.

Figure 6:
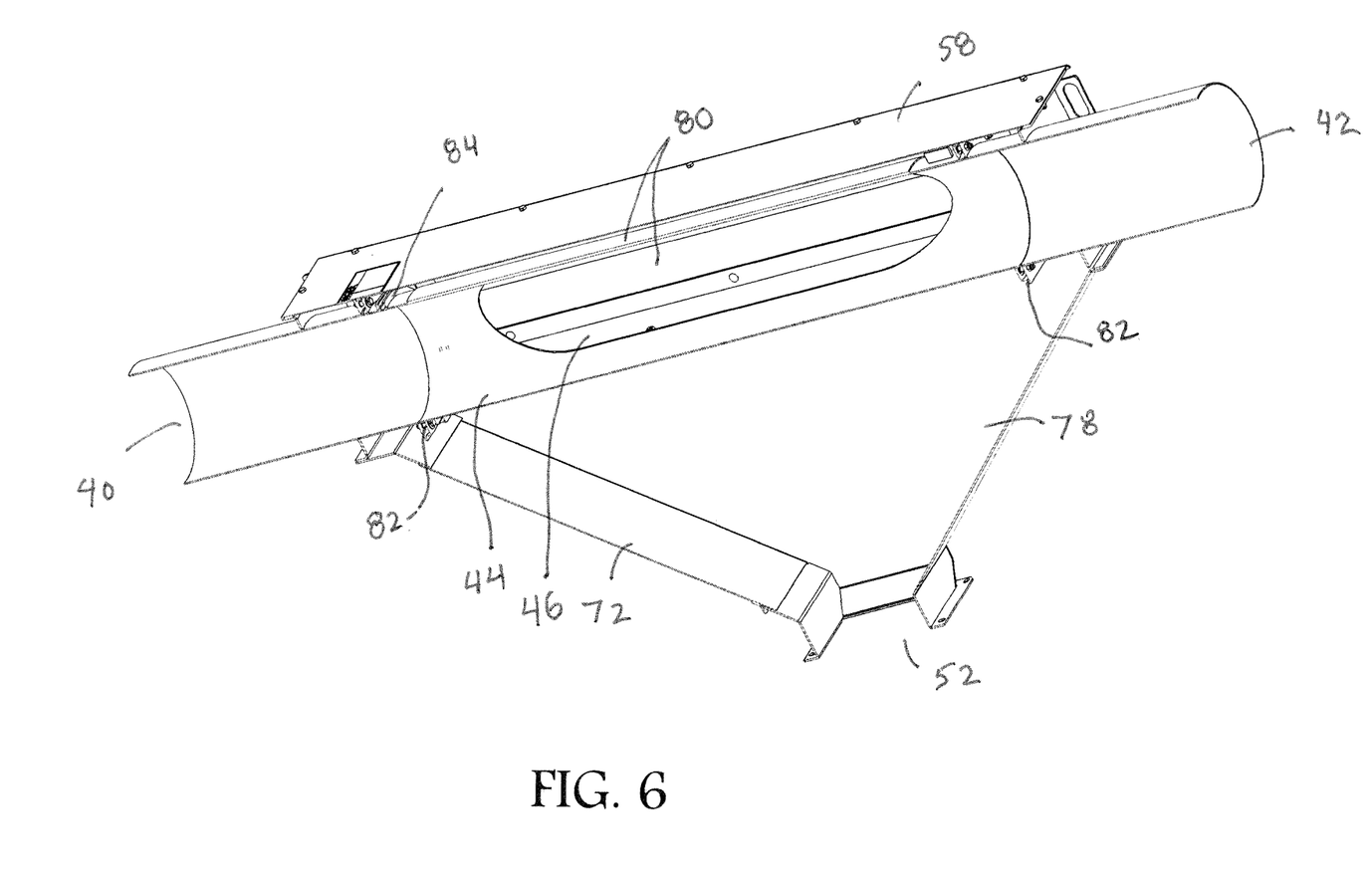
FIG. 6 is a cross-sectional view of the discharge spout of FIG. 2.

FIG. 6 is a cross-sectional view of the modular discharge spout 16 taken generally along a center longitudinal axis of the tube 44. In this view the tube opening 46 is depicted as having been rotated toward an opened configuration. As shown, movable tube 44 is similarly sized to and aligned with stationary tubes 40, 42 to allow the chain and paddles to freely transition through the discharge spout 16.

Figure 7:
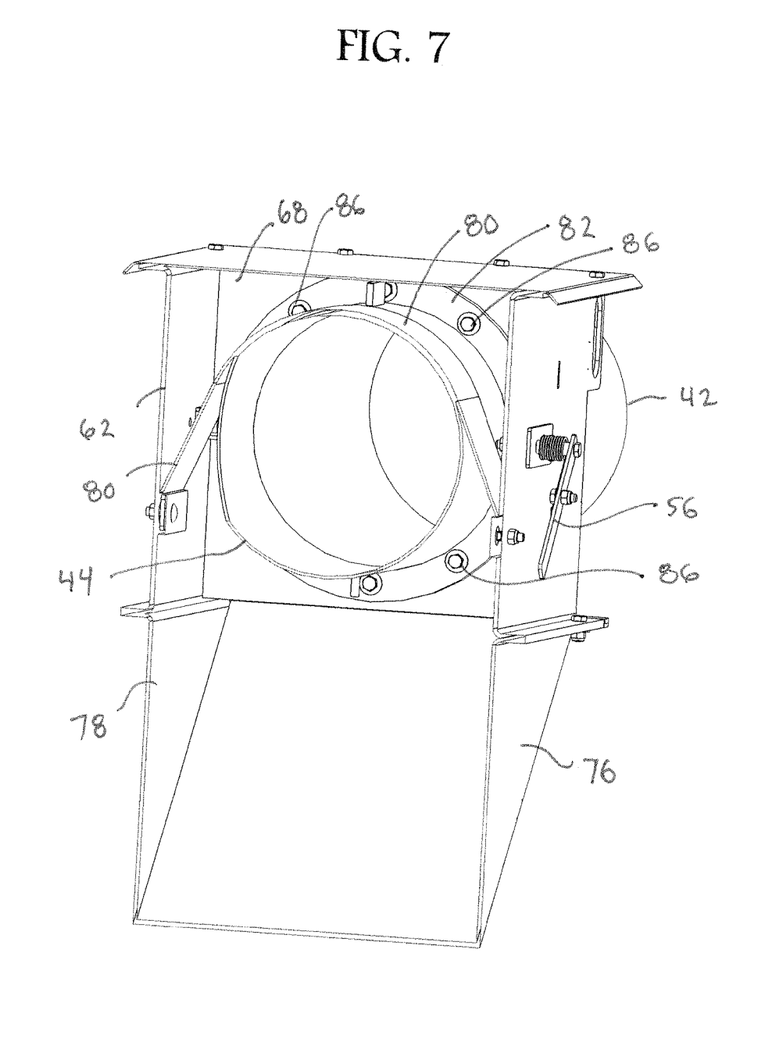
FIG. 7 is another cross-sectional view of the discharge spout of FIG. 2.

FIG. 7 is another cross-sectional view of the discharge spout 16 taken in a transverse direction and which illustrates a split ring bearing 82 fastened to panel 68 via threaded fasteners 86. Bearing 82 may be of UHMW polymer or other low friction material. The outer surface of movable tube 44 engages the inner bearing surface of bearing 82 allowing tube 44 to be supported at its ends and relatively freely rotatable.

Figure 8:
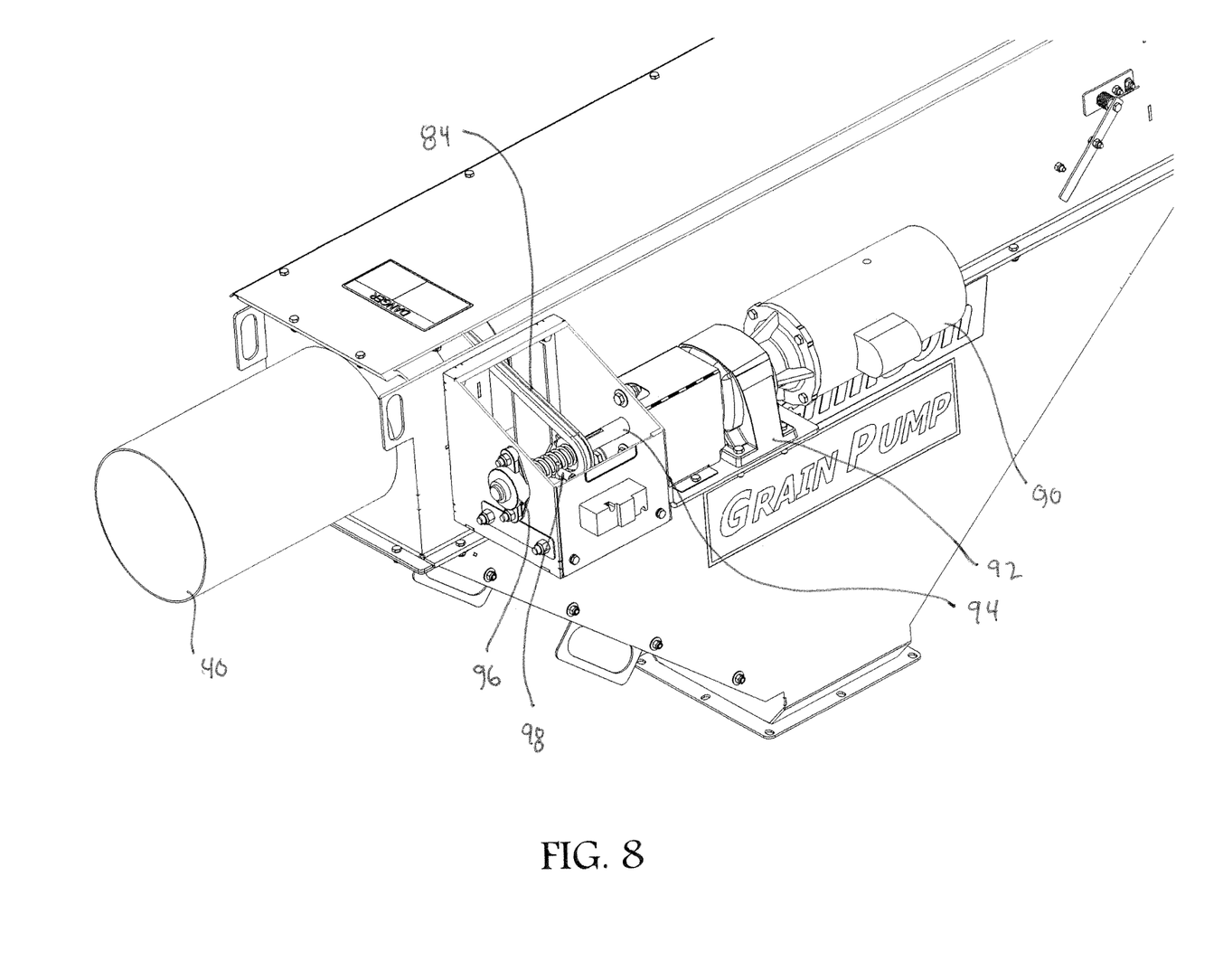
FIG. 8 is a detailed perspective view of the discharge spout of FIG. 2.

Referring to FIG. 8, motor assembly 50 include an electric motor 90 coupled to a speed reducer 92 and driving an output shaft 94. A pair of journal bearings 96 support the output shaft 94 within the sub-frame component. A chain sprocket 98 is connected to output shaft 94. Drive chain 84 engages sprocket 98 to rotate the movable tube 44 to a discharge orientation with tube opening 46 positioned to allow grain release. After grain discharge, the direction of electric motor assembly 50 is reversed to rotate output shaft 94 and movable tube 44 back to its non-discharge orientation with cover 80 blocking tube opening 46.

Figure 9:
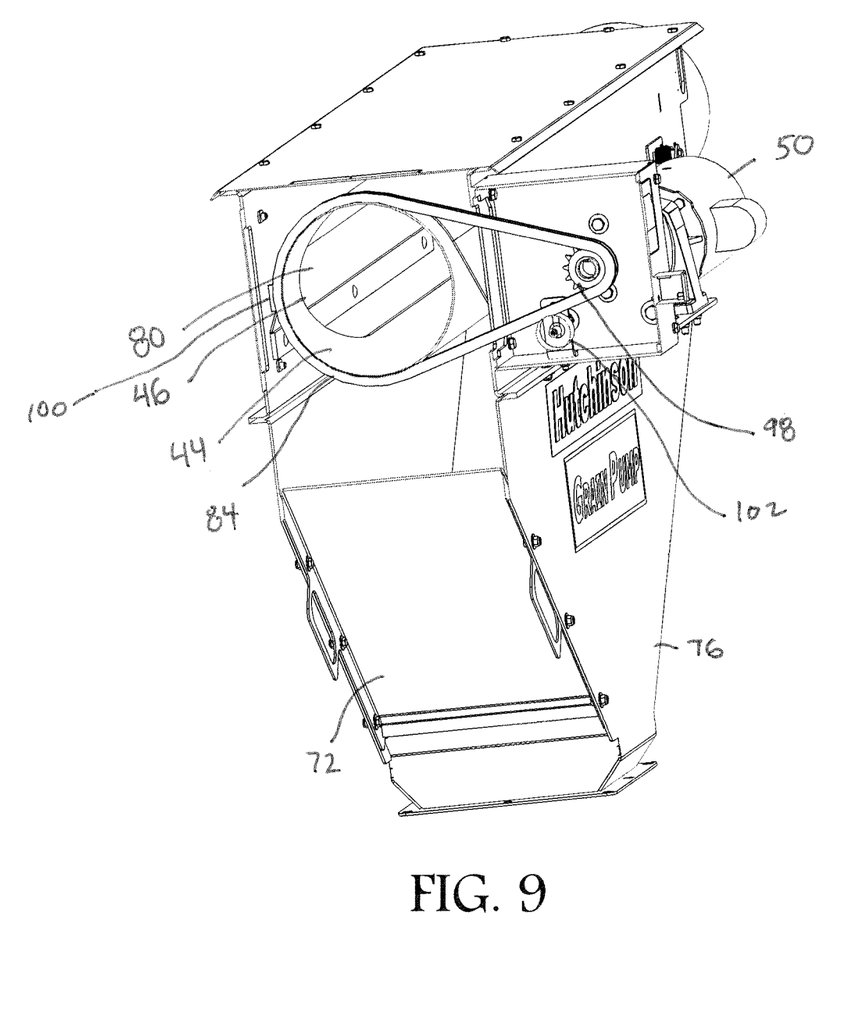
FIG. 9 is a cross-sectional view of the discharge spout of FIG. 2.

Referring to FIG. 9, ends of the drive chain 84 are connected to a chain tab 100 on the tube 44 and in operation the tube 44 rotates in unison with rotation of output shaft 94 to control the position of the outlet opening 46 of movable tube 44. An adjustable chain tensioner 102 is provided to reduce chain slack.

Figure 10:
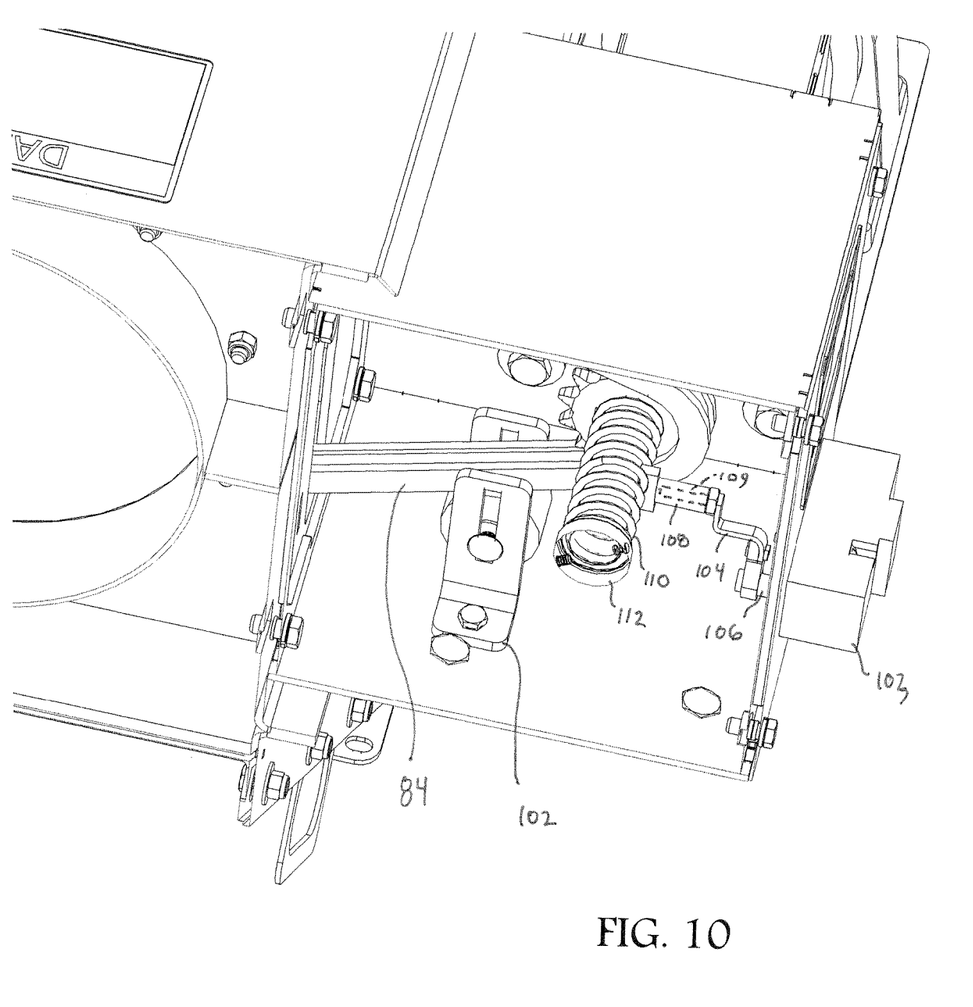
FIGS. 10 and 11 are detailed view of the discharge spout of FIG. 2.
Figure 11:
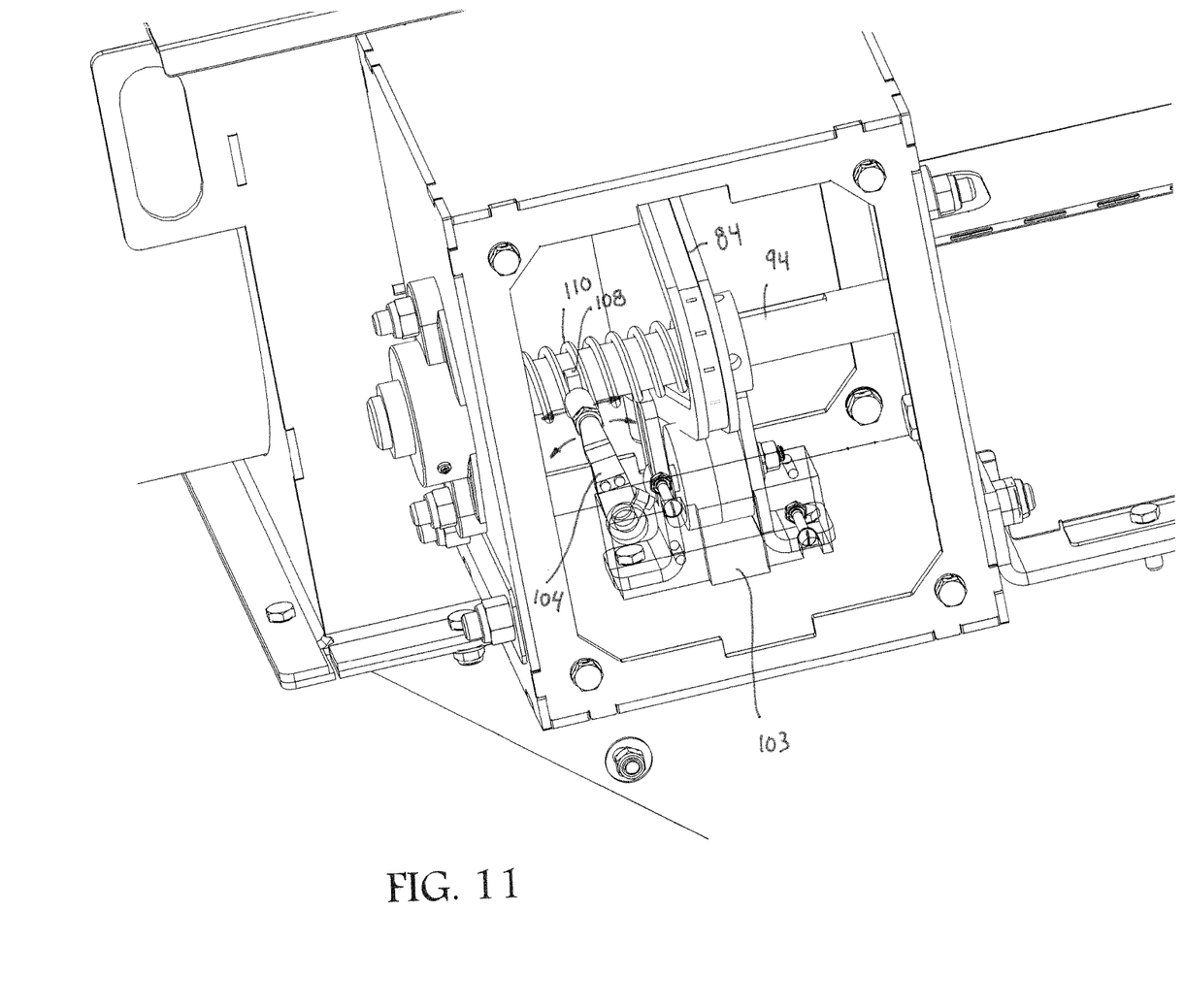

Referring to FIGS. 10 and 11, a limit switch 103 is used to control the position of movable tube 44. A limit switch arm 104 is secured to an input shaft 106 of limit switch 103. A freely-rotatable cam 108 is coupled to the limit switch arm 104. Cam 108 is rotatably supported on shaft 109. The cam 108 engages a coil of spring 110 and follows within the spring coil as the spring 110 is rotated. Spring 110 is connected at one end 112 to the output shaft 94 and therefore rotates when the output shaft 94 is rotated. As spring 110 is rotated, cam 108 freely rotates about shaft 109 as the cam 108 slightly rotates as the cam 108 maintains contact between the coils. Therefore as the output shaft 94 rotates, the spring 110 also rotates and the cam 108 follows within the spring 110 coil and rotates the input shaft 106 of limit switch 103. Spring 110, cam 108 and spring arm 104 together convert rotary motion of the electric motor assembly 50 and output shaft 94 into a rotary input into limit switch 103.

In one embodiment of the present invention, the limit switch 103 controls ON/OFF power to the motor 90 when the limit switch arm 104 reaches an angular limit (for example, 10 degrees of rotation either way). The limit switch 103 also reverses polarity to the motor 90 allowing the motor to rotate in an opposite direction once the limit is reached.

Figure 12:
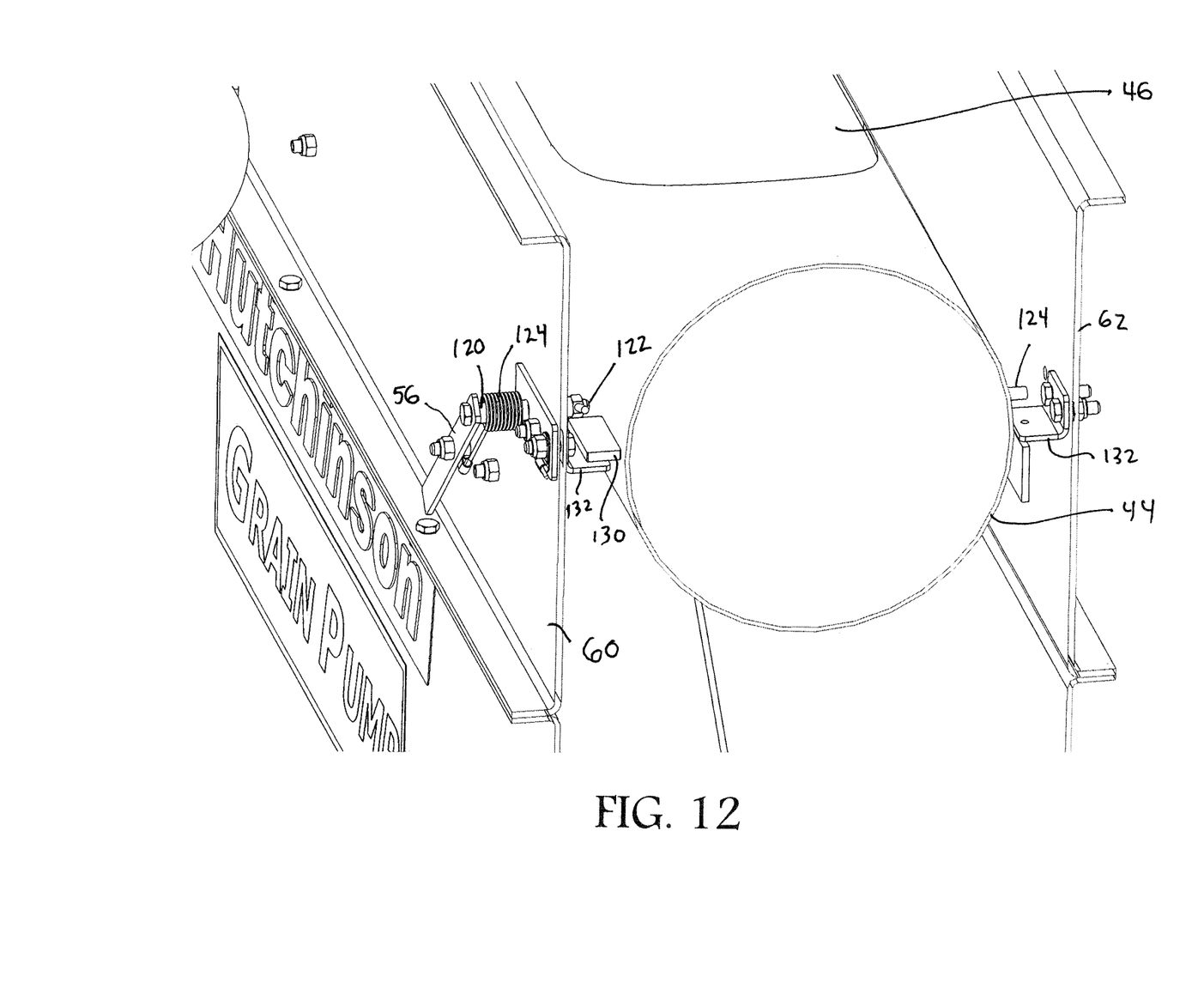
FIG. 12 is a detailed view of the discharge spout of FIG. 2.

Referring to FIG. 12, indicator arm 56 rotates with shaft 120 as the tube 44 is rotated between open and closed positions and provides an external indicator of tube position visible, for example, from nearby ground. Shaft 120 is rotatably held within panel 60 and a pin 122 is connected at the opposite end of shaft 120. A spring 124 is coupled between indicator arm 56 and panel 60 and biases the indicator arm in a clockwise direction. When the movable tube 44 is rotated into a discharge position (approximately 180 degrees), a pin 124 attached to the tube 44 rotates into contact with pin 122. Indicator arm 56 is rotated to a generally vertical orientation as the pin 124 engages pin 122. When the movable tube 44 is then rotated back to the closed orientation, pin 124 disengages from pin 122 and spring 124 biases the indicator arm 56 away from vertical. Movable tube 44 also includes a tab 130 which may engage a pair of hard stops 132 to limit rotation of movable tube.

Figure 13:
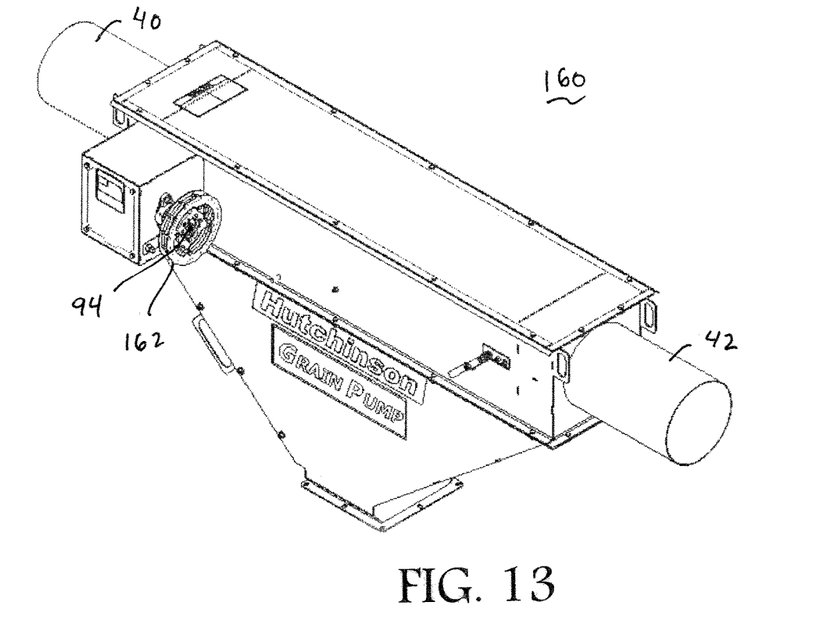
FIG. 13 is a perspective view of another embodiment of a discharge spout in accordance with the present invention.
Figure 14:
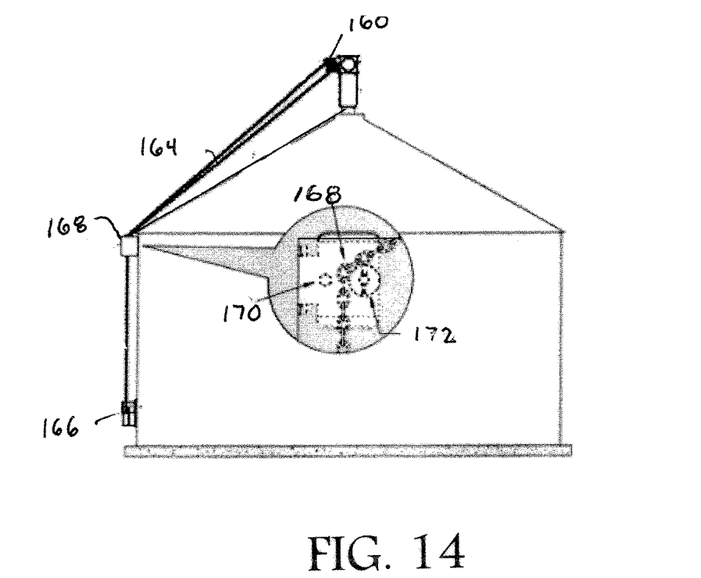
FIG. 14 is an elevational depiction of a grain storage system incorporating the discharge spout of FIG. 13.

Referring to FIGS. 13 and 14, another embodiment of the invention is illustrated as a manually operated discharge spout 160. In this embodiment a chain and pulley system is used to rotate the movable tube 44 of the discharge spout 160. A spout control sprocket 162 is attached at one end of output shaft 94. An external control chain 164, accessible from a remote location such as the ground, is used to rotate sprocket 162, shaft 94 and movable tube 44 in a manner similar to the embodiment of FIGS. 1-12. A loop of control chain 164 may wrap around sprocket 162 and extend to a lower chain mount 166. An upper chain mount 168 may include a guide bolt 170 and roller guide 172. The movable tube 44 rotates between opened and closed positions as the control chain 164 is manipulated at a remote location.

Figure 15:
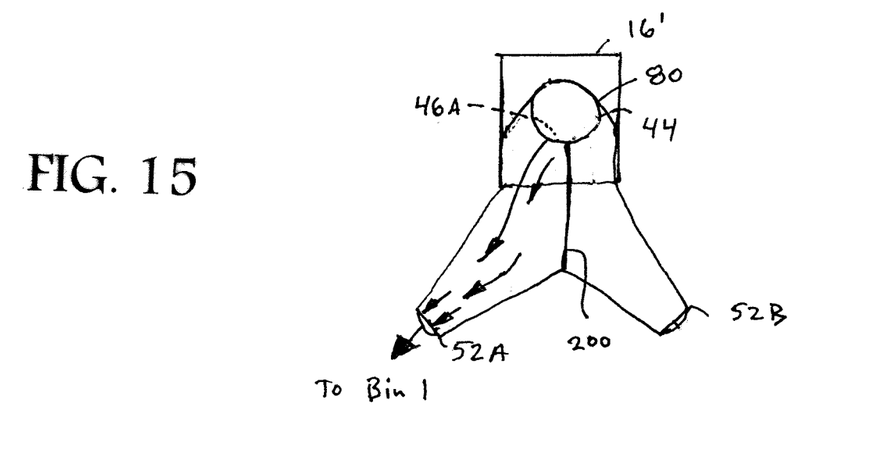
FIG. 15 depicts operation of another embodiment of the present invention wherein product is being discharged to bin 1.
Figure 16:
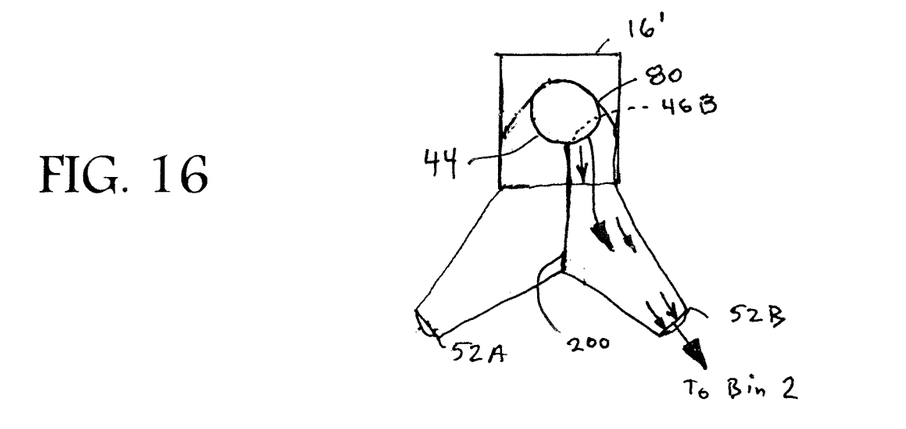
FIG. 16 depicts operation of the embodiment of FIG. 15 wherein product is being discharged to bin 2.

FIGS. 15 and 16 depict another embodiment of a discharge spout 16' of the present invention. Discharge spout 16' include a pair of discharge outlets 52A, 52B suitable, for example, to direct product between a pair of storage bins, for example Bin 1 and Bin 2. In this embodiment, a single opening or a pair of tube openings may be positioned as depicted at 46A or 46B to allow product to exit the tube 44. A divider 200, such as a sheet or panel, separates the two sides and prevents cross flow of product between the discharge outlets 52A, 52B. The tube 44 would be rotated between a closed position or between outlet positions A, B to control flow of product within discharge spout 16'. For example, in FIG. 15, the discharge opening 46A is rotated to a position to allow product to drop and discharge out of outlet 52A and into Bin 1. In FIG. 16, discharge opening 46B is rotated to a position to allow product to drop and be discharged out of outlet 52B and into Bin 2.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A discharge assembly for a tube-based conveying system comprising:
    a pair of stationary tube sections through which product can be conveyed by a chain and paddle conveyor, with the chain and paddle conveyor being circulated around an endless loop to move the product therethrough;
    a rotatable tube section held between the pair of stationary tube sections, with the chain and paddle conveyor passing through the rotatable tube section to move product therethrough, and said rotatable tube section including a side opening through which product moved by the chain and paddle conveyer can be selectively discharged; and
    a flexible sheet held against the rotatable tube section and blocking the discharge of product when the side opening of the rotatable tube section is covered by the sheet.

2. The discharge assembly of claim 1 further comprising an electric motor assembly and transmission for rotating the rotatable tube section relative to the pair of stationary tube sections.

3. The discharge assembly of claim 2 wherein the electric motor assembly includes a limit switch which defines a range of motion of the rotatable tube section.

4. The discharge assembly of claim 2 wherein the transmission includes a speed reducer and an output shaft coupled to a chain sprocket, with a chain coupled between the chain sprocket and the rotatable tube section.

5. The discharge assembly of claim 1 further comprising an indicator arm providing indicia of rotatable tube position to a remote location.

6. The discharge assembly of claim 5 wherein the indicator arm rotates between a pair of positions to indicate whether the rotatable tube section is an opened or closed orientation.

7. A flow-through discharge assembly for a tube-based conveying system comprising:
    a pair of stationary tube sections on opposite sides of a housing, said pair of tube sections adapted to be coupled to other tube sections of the conveying system in a modular manner, and with a chain and paddle conveyor traveling through the pair of tube sections and other tube sections of the conveying system to move product therethrough;
    a rotatable tube section held within the housing and aligned to allow product to flow through the discharge assembly when the rotatable tube section is in a through-flow orientation, said rotatable tube section also including at least one opening through which product can be selectively released when the rotatable tube section is rotated to a discharge orientation; and a cover held within the housing and selectively blocking a release of product out of the at least one opening when the rotatable tube section is in the through-flow orientation.

8. The discharge assembly of claim 7 further comprising an electric motor assembly and transmission coupled to rotate the rotatable tube section between the through-flow orientation and the discharge orientation.

9. The discharge assembly of claim 8 wherein the electric motor assembly includes a limit switch which defines a range of motion of the rotatable tube section.

10. The discharge assembly of claim 8 wherein the transmission includes a speed reducer and an output shaft coupled to a chain sprocket, with a chain coupled between the chain sprocket and the rotatable tube section.

11. The discharge assembly of claim 7 wherein the cover is a flexible sheet partially wrapped against the rotatable tube section.

12. The discharge assembly of claim 7 further comprising an indicator arm providing indicia of rotatable tube position to a remote location.

13. The discharge assembly of claim 12 wherein the indicator arm rotates between a pair of positions to indicate whether the rotatable tube section is in an opened or closed orientation.

14. A flow-through discharge assembly for a modular tube-based conveying system comprising:

a housing having an opposed pair of tube sections adapted to be coupled with other tube sections of the conveying system, and with a chain and paddle conveyor traveling through the pair of tube sections and other tube sections of the conveying system to move product therethrough;

a rotatable tube section held between the opposed pair of tube sections and with the chain and paddle conveyor traveling through the rotatable tube section, said rotatable tube section having a side opening through which product can be discharged when the rotatable tube section is rotated into a discharge orientation; and a cover held within the housing and partially wrapping around the rotatable tube section, with said cover blocking a flow of product out of the side opening when the rotatable tube section is rotated into a through-flow orientation.

15. The discharge assembly of claim 14 wherein the cover is a sheet of flexible material that seals closed the side opening of the rotatable tube section to prevent cross-contamination from dust and fines.

* * * * *